US011593062B2

(12) United States Patent
Watson et al.

(10) Patent No.: US 11,593,062 B2
(45) Date of Patent: *Feb. 28, 2023

(54) CHANGING COMPANION COMMUNICATION DEVICE BEHAVIOR BASED ON STATUS OF WEARABLE DEVICE

(71) Applicant: Apple Inc., Cupertino, CA (US)

(72) Inventors: Robert D. Watson, Menlo Park, CA (US); David John Shaw, San Diego, CA (US); Arun Dhyaneshwar Chawan, San Francisco, CA (US); Matthew Gillette, San Ramon, CA (US); Ganesha Adkasthala Ganapathi Batta, San Jose, CA (US); Jeffrey Chandler Moore, Belmont, CA (US); Patrick Ian Bernhard, San Jose, CA (US); Baek San Chang, San Francisco, CA (US); Patrick Lee Coffman, San Francisco, CA (US); Jonathan Anderson Bennett, San Francisco, CA (US); Anthony Guetta, San Carlos, CA (US); Jahan Christian Minoo, San Francisco, CA (US); Keith Walter Rauenbuehler, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/222,934

(22) Filed: Apr. 5, 2021

(65) Prior Publication Data
US 2021/0294565 A1 Sep. 23, 2021

Related U.S. Application Data

(63) Continuation of application No. 16/120,081, filed on Aug. 31, 2018, now Pat. No. 10,970,030, which is a
(Continued)

(51) Int. Cl.
G06F 3/16 (2006.01)
H04R 29/00 (2006.01)
H04R 1/10 (2006.01)

(52) U.S. Cl.
CPC .............. *G06F 3/165* (2013.01); *G06F 3/162* (2013.01); *H04R 1/1041* (2013.01);
(Continued)

(58) Field of Classification Search
None
See application file for complete search history.

(56) References Cited

U.S. PATENT DOCUMENTS 7,004,582 B2 2/2006 Jannard et al.
7,930,007 B2 4/2011 Andreasson
(Continued)

FOREIGN PATENT DOCUMENTS

CN 1720763 A 1/2006
EP 2675187 A1 12/2013
(Continued)

OTHER PUBLICATIONS

PCT Patent Application No. PCT/US2016/035583—International Search Report and Written Opinion dated Sep. 19, 2016.
(Continued)

*Primary Examiner* — Hemant S Patel
(74) *Attorney, Agent, or Firm* — Dickinson Wright RLLP

(57) ABSTRACT

Systems, methods, and non-transitory computer-readable storage media for detecting a wearing status of a wearable device, the wearing status indicating whether a user is wearing the wearable device and sending wearing status data to a companion communication device to control a behavior of the companion communication device.

21 Claims, 13 Drawing Sheets

Call Answered When Wearing Status Indicates the Ear Bud Placed In Ear

Related U.S. Application Data continuation of application No. 15/172,070, filed on Jun. 2, 2016, now Pat. No. 10,067,734.

(60) Provisional application No. 62/171,338, filed on Jun. 5, 2015.

(52) U.S. Cl.
CPC ......... *H04R 29/001* (2013.01); *H04R 1/1016* (2013.01); *H04R 2420/07* (2013.01)

(56) References Cited

U.S. PATENT DOCUMENTS

| | | | |
|---|---|---|---|
| 7,945,297 | B2 | 5/2011 | Philipp |
| 8,199,956 | B2 | 6/2012 | Haartsen et al. |
| 10,067,734 | B2 * | 9/2018 | Watson ............... H04R 29/001 |
| 10,970,030 | B2 * | 4/2021 | Watson ............... G06F 3/162 |
| 2004/0160572 | A1 | 8/2004 | Jannard et al. |
| 2007/0281744 | A1 | 12/2007 | Andreasson |
| 2007/0297618 | A1 | 12/2007 | Nurmi et al. |
| 2009/0124286 | A1 | 5/2009 | Hellfalk et al. |
| 2009/0154720 | A1 | 6/2009 | Oki |
| 2010/0020998 | A1 | 1/2010 | Brown et al. |
| 2011/0022203 | A1 | 1/2011 | Woo et al. |
| 2011/0144779 | A1 | 6/2011 | Janse et al. |
| 2012/0045990 | A1 * | 2/2012 | Sandell ............... H04M 1/6066 455/41.2 |
| 2012/0099738 | A1 | 4/2012 | Lee et al. |
| 2012/0155670 | A1 | 6/2012 | Rutschman |
| 2012/0207319 | A1 | 8/2012 | Tsuchiya et al. |
| 2012/0244812 | A1 | 9/2012 | Rosener |
| 2013/0038458 | A1 | 2/2013 | Toivola et al. |
| 2013/0279724 | A1 | 10/2013 | Stafford et al. |
| 2013/0343585 | A1 | 12/2013 | Bennett et al. |
| 2013/0345842 | A1 * | 12/2013 | Karakaya ............ H04R 1/1041 700/94 |
| 2014/0016803 | A1 | 1/2014 | Puskarich |
| 2014/0146976 | A1 | 5/2014 | Rundle |
| 2014/0314247 | A1 | 10/2014 | Zhang |
| 2015/0063587 | A1 | 3/2015 | Park et al. |
| 2015/0189421 | A1 | 7/2015 | Chou |
| 2016/0357510 | A1 | 12/2016 | Watson et al. |
| 2018/0373493 | A1 | 12/2018 | Watson et al. |

FOREIGN PATENT DOCUMENTS

| | | |
|---|---|---|
| JP | 2000013294 A | 1/2000 |
| JP | 2000138751 A | 5/2000 |
| JP | 2002152371 A | 5/2002 |
| JP | 2004120652 A | 4/2004 |
| JP | 2005534269 A | 11/2005 |
| JP | 2007235767 A | 9/2007 |
| JP | 2007243691 A | 9/2007 |
| JP | 2008204330 A | 9/2008 |
| JP | 2009010798 A | 1/2009 |
| JP | 2010523018 A | 7/2010 |
| JP | 2011103580 A | 5/2011 |
| JP | 2020031444 A | 2/2020 |

OTHER PUBLICATIONS

Korean Patent Application No. 10-2017-7035139—Notice to File a Response (""preliminary rejection"") dated Nov. 20, 2018.
Japanese Patent Application No. 2017-560216—Office Action dated Dec. 10, 2018.
European Patent Application No. 16804471.7—Extended European Search Report dated Dec. 14, 2018.
Korean Patent Application No. (PCT) 10-2017-7035139—Notice of Allowance dated May 20, 2019.
Chinese Patent Application No. 201680032441.7—First Office Action and Search Report dated May 24, 2019.
Korean Patent Application No. 10-2019-7021653—Notice of Preliminary Rejection dated Oct. 16, 2019.
European Patent Application No. 16804471.7—Communication pursuant to Article 94(3) EPC dated Jan. 14, 2020.
Japanese Patent Application No. 2019-209546—Office Action dated Sep. 28, 2020.
European Patent Application No. 16804471.7—Communication pursuant to Article 94(3) EPC dated Oct. 15, 2020.
Indian Patent Application No. 201717043672—First Examination Report dated Nov. 6, 2020.
Japanese Patent Application No. 2021-101411—Office Action dated Sep. 20, 2022.
European Patent Application No. 22187489.4—Extended European Search Report dated Oct. 28, 2022.

* cited by examiner

Text Message Received, Wearing Status Changes to In-Ear Within Threshold Time

Audio Output from Microphone Sent to Companion Device for Voice Dictation

Voice Dictation Feature Automatically Enabled to Dictate Text Message Reply

CHANGING COMPANION COMMUNICATION DEVICE BEHAVIOR BASED ON STATUS OF WEARABLE DEVICE

CROSS-REFERENCE TO RELATED APPLICATIONS

This application is a continuation of U.S. patent application Ser. No. 16/120,081, entitled "CHANGING COMPANION DEVICE BEHAVIOR BASED ON STATUS OF WEARABLE DEVICE", filed Aug. 31, 2018, set to issue Apr. 6, 2021 as U.S. Pat. No. 10,970,030, which is a continuation of U.S. patent application Ser. No. 15/172,070, entitled "CHANGING COMPANION DEVICE BEHAVIOR BASED ON STATUS OF WEARABLE DEVICE", filed Jun. 2, 2016, issued as U.S. Pat. No. 10,067,734 on Sep. 4, 2018, which claims the benefit of U.S. Provisional Application No. 62/171,338, entitled "CHANGING COMPANION DEVICE BEHAVIOR BASED ON STATUS OF WEARABLE DEVICE", filed Jun. 5, 2015, the content of which are incorporated herein by reference in their entirety for all purposes.

FIELD

The present technology pertains to controlling a device, including to controlling a device paired with a wearable device based on the status of the wearable device.

BACKGROUND

Electronic devices can change their behavior based on whether a peripheral device is connected to the electronic device. For example, a music player device can route audio to a pair of headphones when the headphones are connected to a headphone jack of the music player device.

Additionally, some peripheral devices can wirelessly connect to an electronic device, and a user can send information to the electronic device by providing an input to the peripheral device. For example, a wireless headset can wirelessly connect with a mobile phone and can include a button on the wireless headset that can be used to answer a voice call on the mobile phone. However, requiring user interaction with a peripheral device to communicate a user command can be non-intuitive, can involve hard-to-press controls, and can otherwise be burdensome.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology involves a wearable device pairing with a companion communication device and sending data to the paired companion communication device, the data describing a wearing status that indicates whether a user is wearing the wearable device and/or whether the wearing status of the wearable device changes. The companion communication device can determine, based on the wearing status data received from the wearable device, one or more actions to take, such as how to route audio data, when to change a behavior of the companion communication device, or when/how to change aspects of an application executing on the companion communication device.

In some embodiments of the present technology, the wearable device is a wireless ear bud that includes sensors for determining when the wireless ear bud is worn in a user's ear. The wireless ear bud can send a signal that indicates changes to the wearing status of the wireless ear bud to indicate whether the wireless ear bud is worn in a user's ear. A paired companion communication device, e.g., a phone, can detect the signal sent by the wireless ear bud and can determine whether to route audio data to the wireless ear bud based on the wearing status of the wireless ear bud. For example, the companion communication device can route audio data to the wireless ear bud when the wireless ear bud is worn in a user's ear and can route audio data to an alternate output of the companion communication device when the wireless ear bud is not worn in a user's ear.

Additionally, a companion communication device paired with a wireless ear bud can determine to control other behaviors of the paired companion communication device based on the signal that indicates changes to the wearing status of the wireless ear bud, e.g., based on whether the wireless ear bud is worn in a user's ear. In some embodiments, a phone call being received at a companion communication device paired with a wireless ear bud is answered and audio data from the phone call is routed to the wireless ear bud in response to detecting that the wireless ear bud is worn in a user's ear without requiring additional user setup, configuration, etc. Also, in some embodiments, when a media application is being played on a companion communication device that is paired with a wireless ear bud, the companion communication device can route audio data to the wireless ear bud when the wireless ear bud is worn in a user's ear and playback can be paused when the wireless ear bud is not worn in (e.g., removed from) the user's ear.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for wearable devices that can pair with a companion communication device and control behaviors of the paired combination of wearable device and companion communication device based at least in part on the wearing status of the device, e.g., whether the wearable device is being worn, being put on, or being taken off. The present technology involves systems, methods, and non-transitory media for pairing one or more wearable devices with a companion communication device and for changing one or more behaviors of the wearable device and/or the companion communication device based on whether the wearable device is worn by a user and/or a change in the wearing status of the wearable device.

As used throughout this disclosure, the terms "wearing," "wearing status," and "worn" can be used to refer to various ways to have on, or otherwise associate with, a user's body wearable technology in one or more manners that allow the wearable technology to be used.

In some embodiments of the present technology, sensors are included as part of wearable devices to determine a wearing status of the wearable devices, and the wearable devices are configured to communicate the wearing status of the wearable device, and changes to the wearing status of the wearable device, to a companion communication device in order to affect a behavior of the companion communication device. Many examples described herein involve a wearing status of a wireless ear bud affecting the behavior of a companion communication device. However, a wide range of wearable technology can be configured to take advantage of the benefits of the present technology. For example, the wearable device can include eyeglasses, sunglasses, headphones, a watch, etc., that include sensors for detecting a wearing status of the wearable device and also include a communication interface for communicating the wearing status of the wearable device to a paired companion communication device.

Figure 1A:
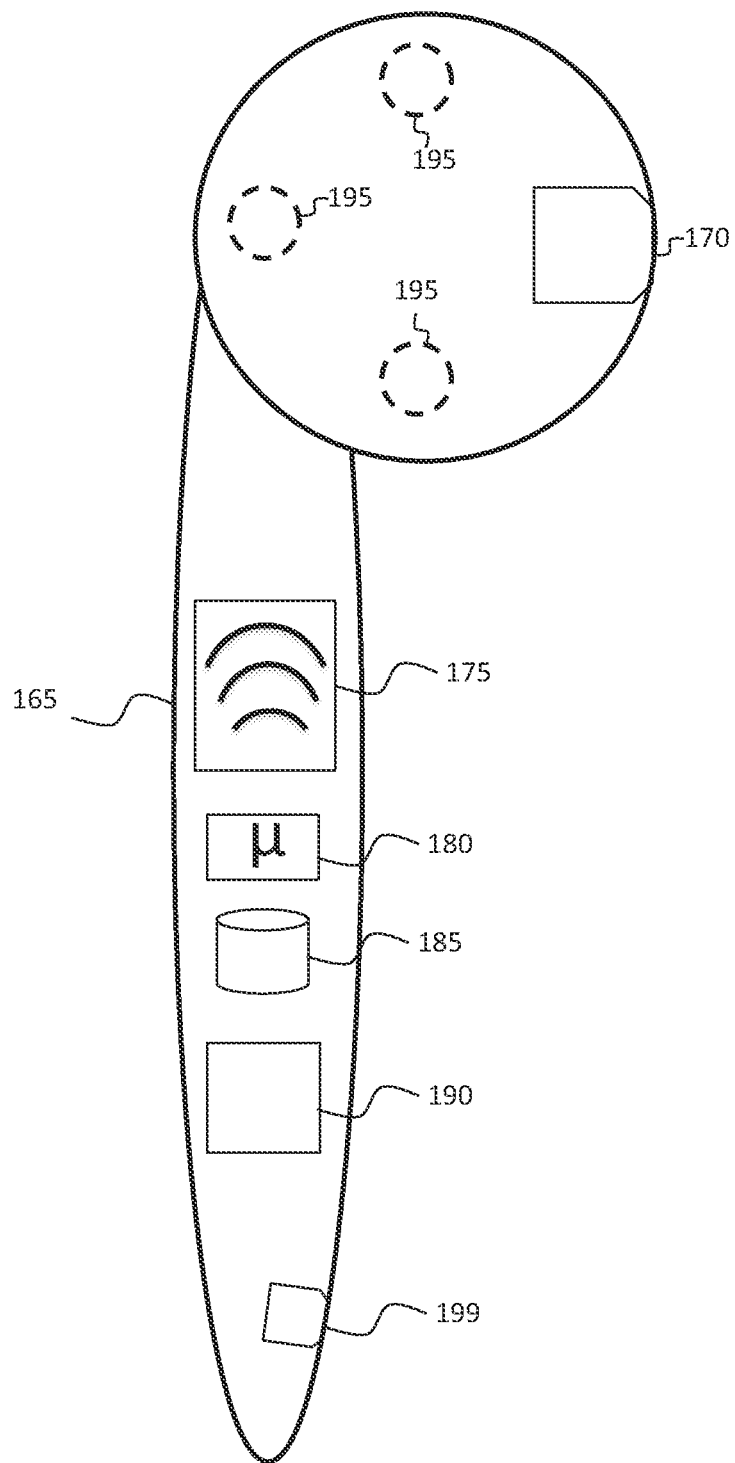
FIG. 1A illustrates an example wireless ear bud that wirelessly pairs with a companion communication device according to some embodiments of the present technology.

FIG. 1A illustrates a wireless ear bud 165 that wirelessly couples with a companion communication device according to some embodiments of the present technology. The wireless ear bud 165 includes a communication interface 175 that can be used to pair the wireless ear bud 165 with the companion communication device. The communication interface 175 can also be used to couple the wireless ear bud 165 with another wireless ear bud to form a pair of untethered, wireless ear buds.

The wireless ear bud 165 includes an audio output 170 for converting a received signal into sound. The signal can be received from a paired companion communication device (not shown) via the communication interface 175. The wireless ear bud 165 also can include a processor 180, memory 185, a battery 190, a microphone 199, and one or more sensors 195 for detecting when the wireless ear bud 165 is placed in an ear. The sensors 195 can be any number and any type of sensor(s) that can detect when the wireless ear bud is in a user's ear. For example, the sensors 195 can include any or all of optical proximity sensors, pressure sensors, heat sensors, moisture sensors, etc. Further, the sensors 195 can be of a single type or multiple types.

The wireless ear bud 165 can be coupled with another wireless ear bud to form a pair of untethered, wireless ear buds. In some cases, one of the coupled wireless ear buds takes a primary role, while the other of the coupled wireless ear buds takes a secondary role, where the former can be referred to as the primary wireless ear bud, while the latter can be referred to as the secondary wireless ear bud. The primary wireless ear bud can perform a number of actions including: (i) pairing with a companion communication device, (ii) receiving audio data from the companion communication device, (iii) routing audio data to the secondary wireless ear bud, (iv) receiving in-ear status information from the secondary wireless ear bud, and (v) sending, to the companion communication device, data regarding the in-ear status of the primary wireless ear bud and/or of the secondary wireless ear bud.

The wireless ear bud 165, in some embodiments, does not include any type of user input such as a button, so a user cannot explicitly provide a manual input to the wireless ear bud 165 to indicate that the user wants the wireless ear bud 165 to perform an action. For example, known headphones can include a button on the headphones that is used to answer an incoming voice call from a connected smartphone.

Accordingly, the present technology involves using a wearing status of a wearable device and using changes in the wearing status of the wearable device to cause changes to a behavior of companion communication devices, which can include changes to the behavior of applications running on companion communication devices.

A wide variety of behaviors on the companion communication device can be changed based on a change in the wearing status of either or both of the wireless ear buds. For example, audio information associated with a music application can be routed to a paired wireless ear bud when the wireless ear bud is inserted into a user's ear. Further, the routing of an audio stream can be changed, e.g., from a speaker to the wireless ear bud, when the wireless ear bud is inserted into a user's ear. Likewise, a control component (e.g., a "play" instruction or a "pause" instruction) can be executed when a paired wireless ear bud is inserted into or is removed from a user's ear.

In another example, an in-coming voice call received at a paired companion communication device, such as a paired smartphone, can be automatically answered by the companion communication device when the companion communication device receives data indicating that a paired wireless ear bud is placed in (or inserted into) a user's ear. Also, the audio from the voice call can be sent to the paired wireless ear bud, and the companion communication device can receive, from the paired wireless ear bud, voice data of the user acquired via the microphone of the paired wireless ear bud. In some embodiments, the voice call can be processed by a voice application executing on the companion communication device.

In some embodiments of the present technology, an operating system or operational settings of a device, e.g., a companion communication device, can be changed in response to a wearing status or to a change in wearing status of a paired wearable device, e.g., a paired wireless ear bud. For example, a companion communication device can have a default setting embedded in its operating system to require a fingerprint sensor to confirm a user's fingerprint before unlocking the companion communication device or before completing a purchase request using the companion communication device. According to the present technology, a pair of glasses with a camera that can perform retinal scanning can detect a user putting on the glasses, scan a user's retina to confirm the user's identity based on the change in wearing status, and automatically send a signal to cause an operating system of a companion communication device to confirm the user's identity and to unlock the companion communication device or to allow the user to complete a purchase request.

Although a number of behaviors are described explicitly herein, those with ordinary skill in the art having the benefit of the present disclosure will readily appreciate that a wide variety of other behaviors can be changed by a companion communication device that receives a wearing status or a change in a wearing status from a paired wearable device.

Figure 1B:
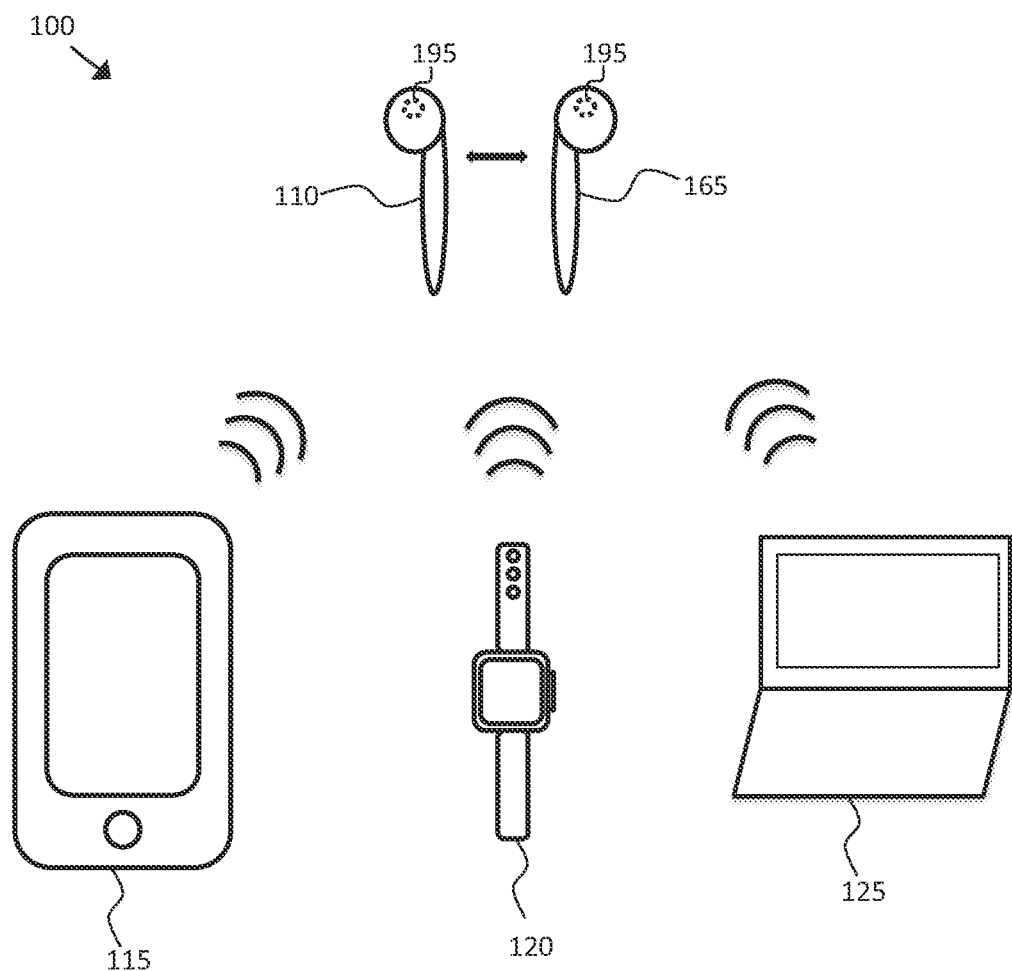
FIG. 1B illustrates an example system having two coupled wearable wireless ear buds paired with one or more companion communication devices according to some embodiments of the present technology.

FIG. 1B illustrates a system 100 having two coupled wearable wireless ear buds 165, 110 paired with one or more companion communication devices 115, 120, 125 according to some embodiments of the present technology. Wireless ear bud 165 can serve as a primary wireless ear bud, and wireless ear bud 110 can serve as a secondary wireless ear bud. The primary wireless ear bud 165 can pair with one or more of the companion communication devices 115, 120, 125 and also can route audio data to the secondary wireless ear bud 110.

The wireless ear buds 165, 110 can detect, via sensors 195, when the wireless ear buds 165, 110 are worn in a user's ear. The primary wireless ear bud 165 can receive data from the secondary wireless ear bud 110 that describes the wearing status of the secondary wireless ear bud 110. Also, the primary wireless ear bud 165 can send its own wearing status and the wearing status of the secondary wireless ear bud 110 to the companion communication devices 115, 120, 125 with which the primary wireless ear bud 165 is paired. Likewise, the primary wireless ear bud 165 can receive data from the paired companion communication devices 115, 120, 125, and the data can reflect a changed behavior of the companion communication devices 115, 120, 125 responsive to a change in the wearing status of one or more of the wireless ear buds 110, 165.

Figure 2:
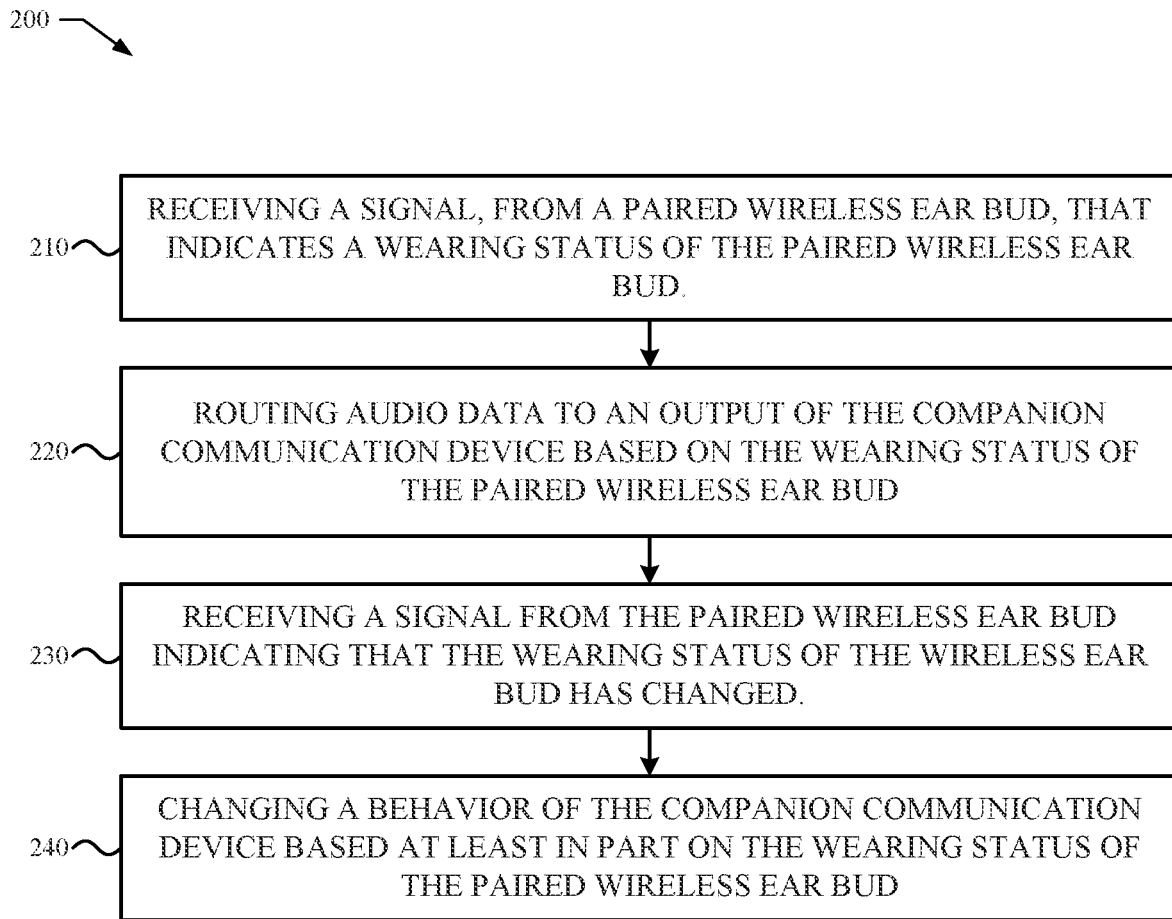
FIG. 2 illustrates an example method of controlling the behavior of a companion communication device wirelessly paired with a wireless ear bud according to some embodiments of the present technology.

FIG. 2 illustrates a flowchart 200 of an exemplary method of controlling the behavior of a companion communication device wirelessly paired with a wireless ear bud according to some embodiments of the present technology. The method includes, at 210, the companion communication device receiving a signal, from the paired wireless ear bud, that indicates a wearing status of the paired wireless ear bud. The method further includes, at 220, the companion communication device routing audio data of the companion communication device to an output of the companion communication device based on the wearing status of the paired wireless ear bud. For example, the signal received from the paired wireless ear bud can indicate the wearing status of the paired wireless ear bud, and when the wearing status of the paired wireless ear bud is that the paired wireless ear bud is worn in a user's ear, the companion communication device can route the audio data of the companion communication device to the paired wireless ear bud. On the other hand, when the signal received from the paired wireless ear bud indicates that the wearing status of the paired wireless ear bud is such that the paired wireless ear bud not worn in the user's ear, the companion communication device can route the audio data to an alternate output such as to a default output, a most recently used output, another available wireless output, or other output of the companion communication device.

At 230, the method also includes the companion communication device receiving a signal from the paired wireless ear bud indicating that the wearing status of the wireless ear bud has changed. In response, at 240, the behavior of the companion communication device can change based at least in part on the wearing status of the paired wireless ear bud as indicated in the signal received from the paired wireless ear bud.

Figure 3A:
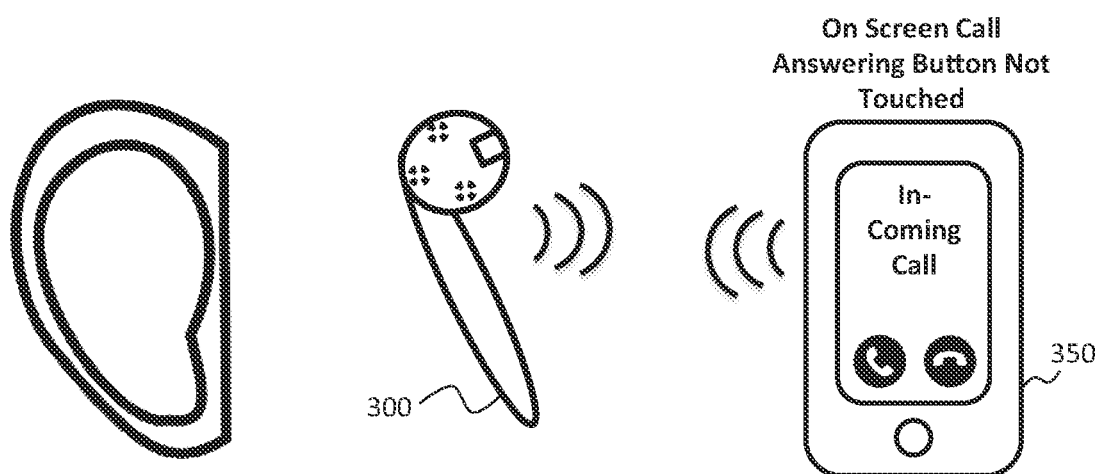
FIGS. 3A-3N illustrate examples of changes to a wearing status of wireless ear buds paired with companion communication devices resulting in changing the behavior of the companion communication devices according to some embodiments of the present technology.
Figure 3B:
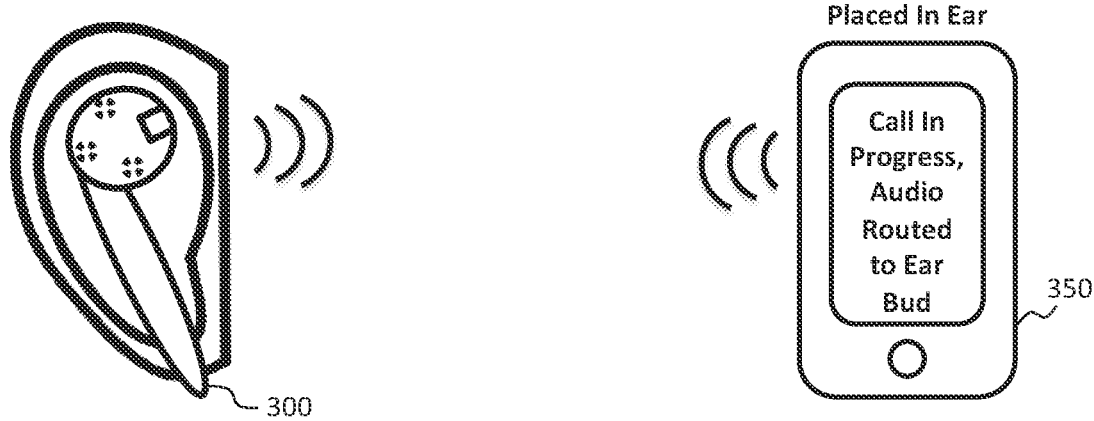
Figure 3C:
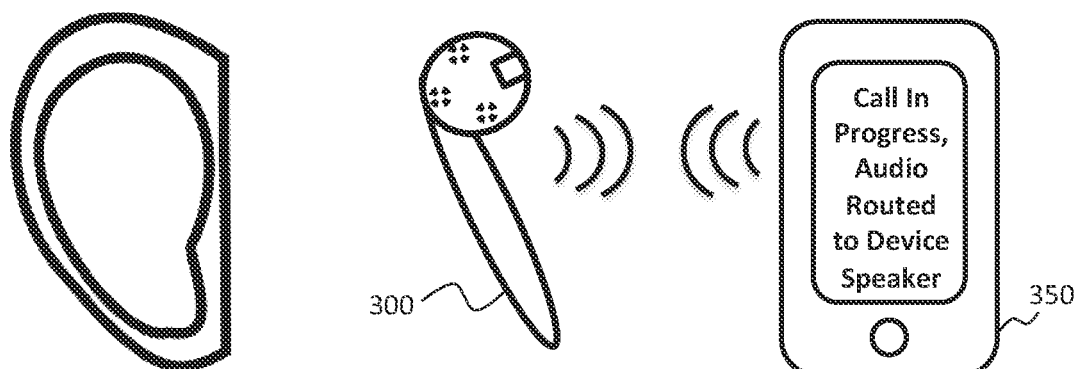
Figure 3D:
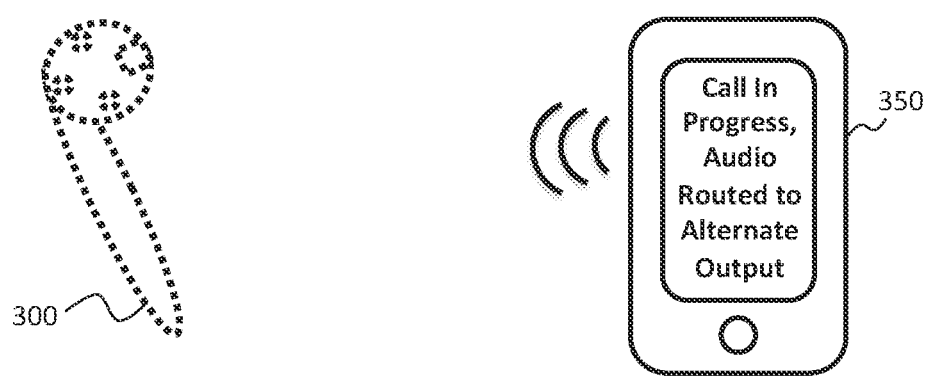
Figure 3E:
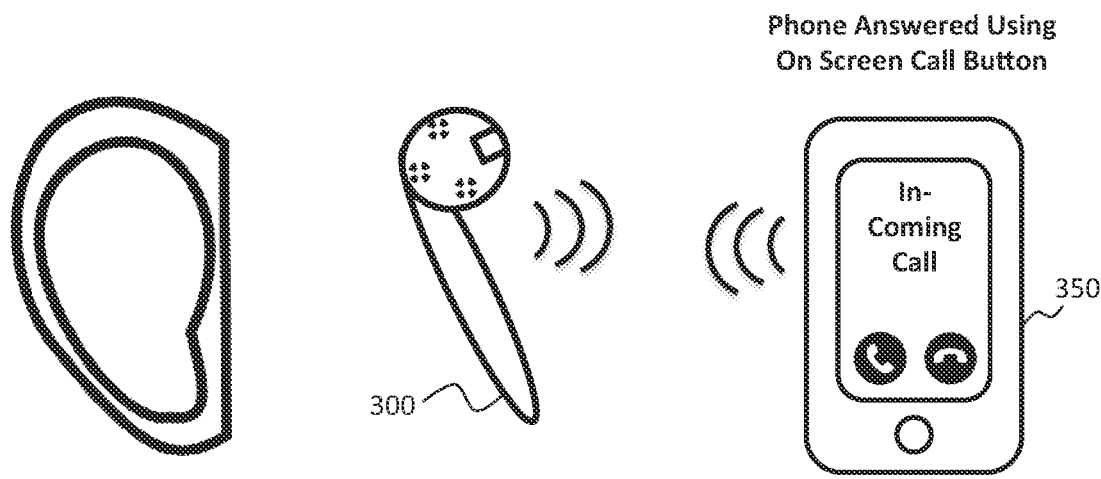
Figure 3F:
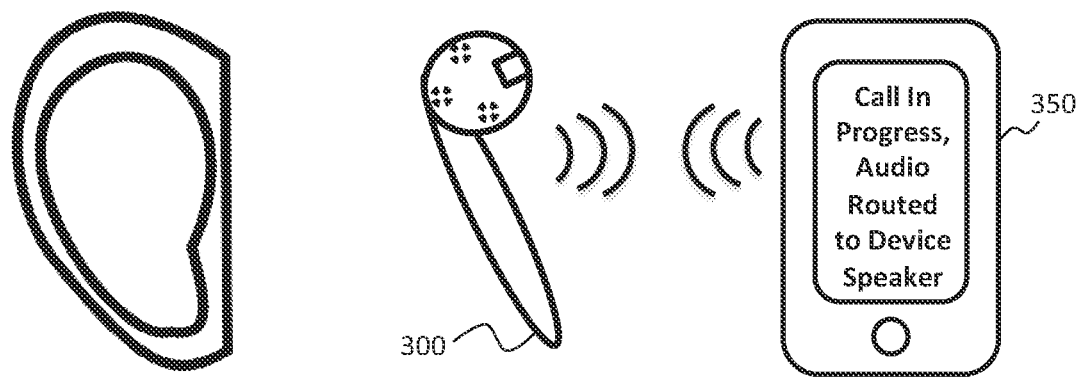
Figure 3G:
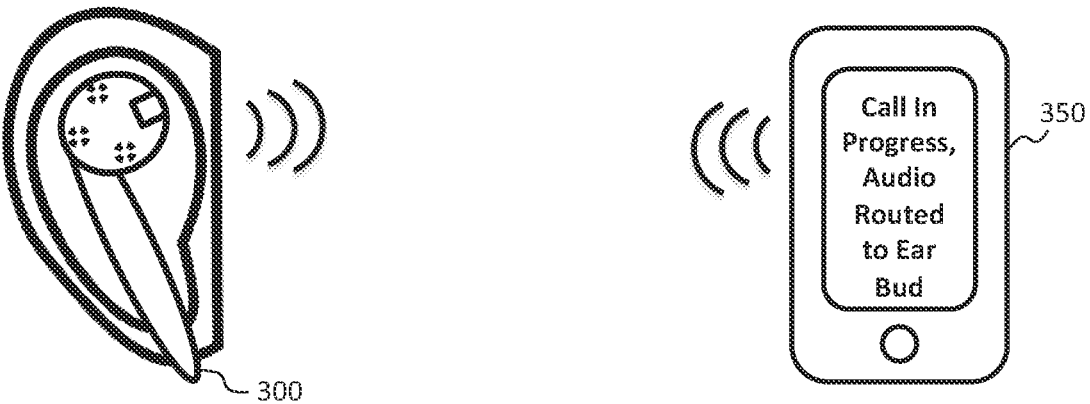
Figure 3H:
Figure 3I:
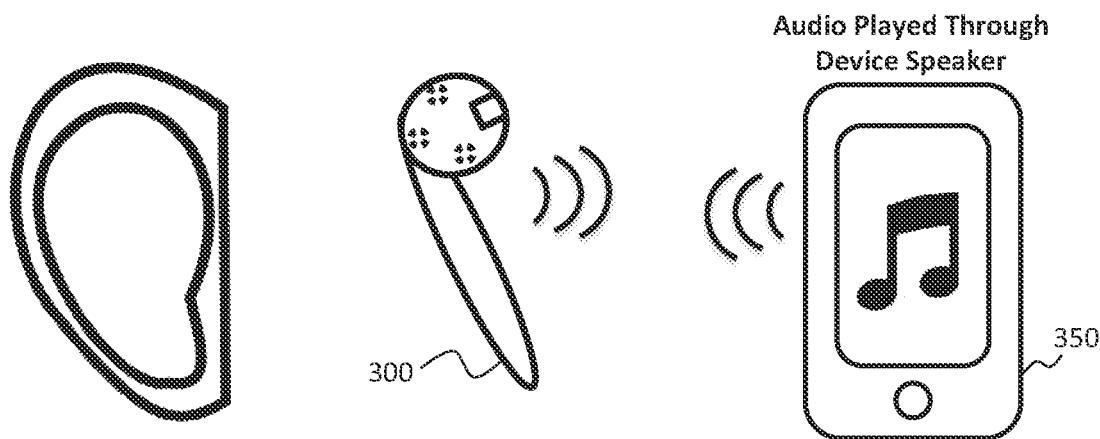
Figure 3J:
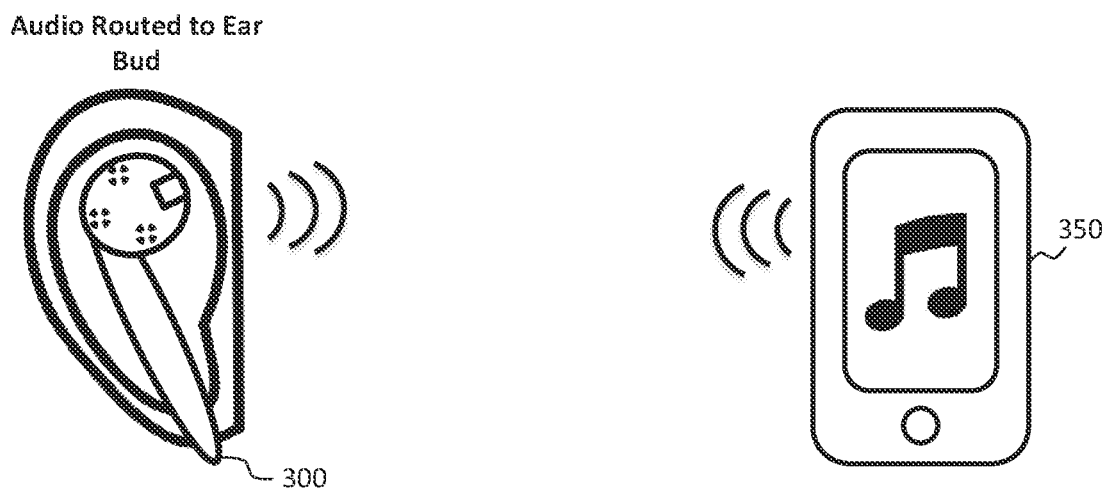
Figure 3K:
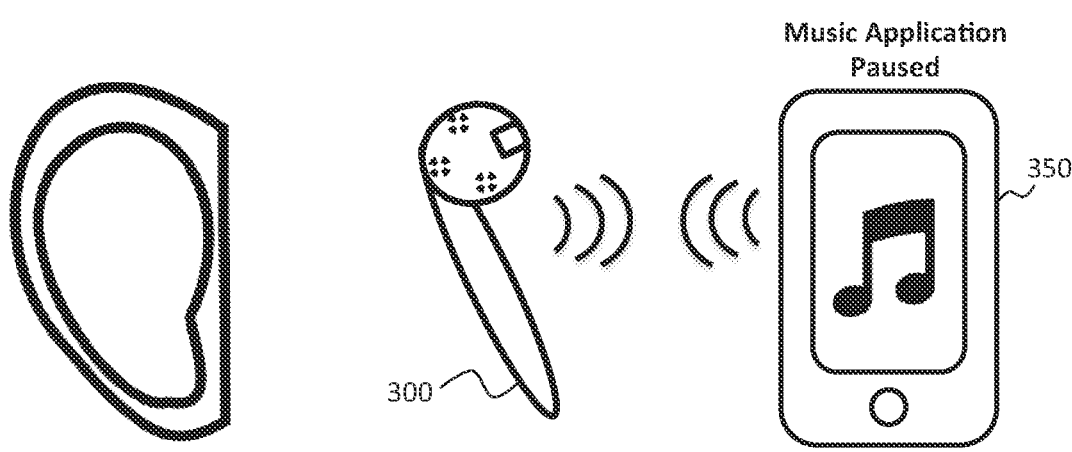
Figure 3L:
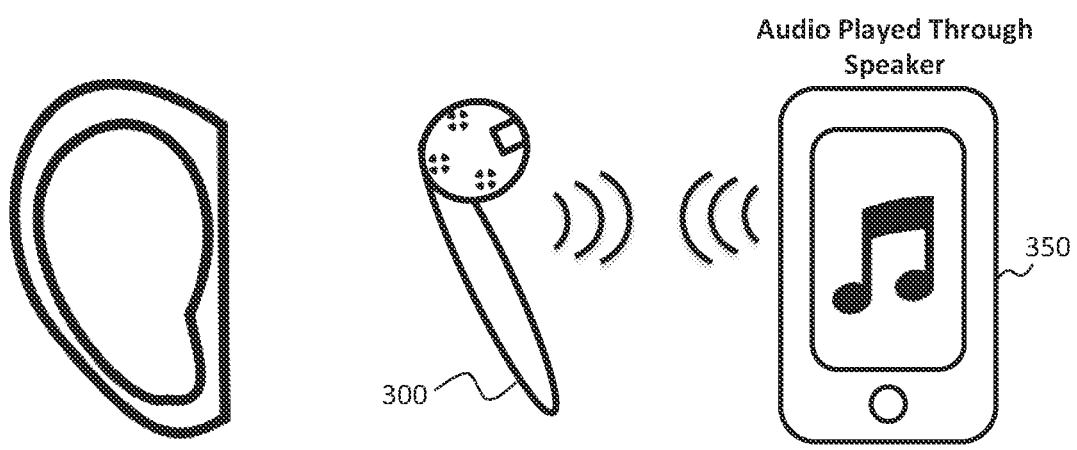
Figure 3M:
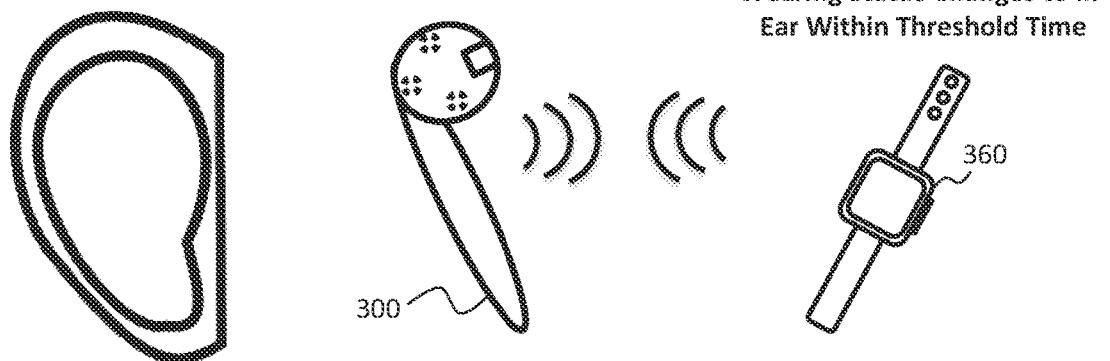
Figure 3N:
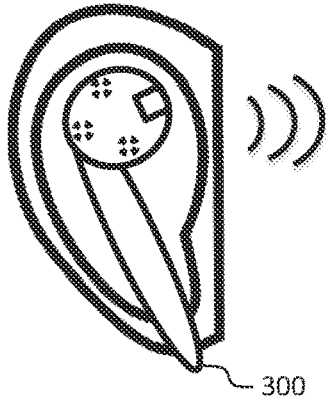
Figure 3N:
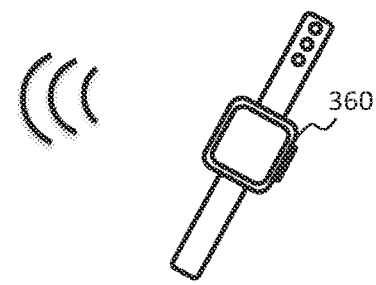

FIGS. 3A to 3N illustrate examples of changes in wearing status of wireless ear buds paired to companion communication devices, where the changes in wearing status changes the behavior of companion communication devices according to some embodiments of the present technology.

FIG. 3A illustrates a wireless ear bud 300 paired with a companion communication device 350 with a voice call being received, but with the on-screen call answering button of the companion communication device 350 not being pressed. As shown in FIG. 3B, the wireless ear bud 300 can detect when it is worn in an ear and can send a signal to the companion communication device 350 indicating a change in wearing status from out-of-ear to in-ear. The companion communication device 350 can use the received signal to perform one or more actions, such as to automatically answer the incoming voice call, to route audio from the voice call to the paired wireless ear bud 300, and to receive user audio data obtained via the microphone of the wireless ear bud 300.

The present technology allows the action of placing a wireless ear bud into an ear to automatically answer a voice call without any user setup, configuration, etc. Also, as explained in greater detail below, in some embodiments, the wireless ear buds can be made discoverable and can pair with a user's companion communication device by opening a wireless ear bud case that houses a pair of wireless ear buds. Accordingly, the present technology can provide a user with the ability to automatically answer a voice call by placing one or both wireless ear buds in the user's ear after opening a wireless ear bud case and without requiring user configuration.

Next, as shown in FIG. 3C, the companion communication device 350 can receive a signal from the paired wireless ear bud 300 that the wearing status of the wireless ear bud has changed from in-ear to out-of-ear, such as when the wireless ear bud is removed from the user's ear. Similarly, as shown in FIG. 3D, the companion communication device 350 can determine that the wireless ear bud 300 is no longer paired with the companion communication device 350. For the events shown in FIGS. 3C and 3D, the companion communication device 350 can determine to route audio for the voice call to a different output of the companion communication device 350, such as to a speaker of the companion communication device 350, an alternate output (e.g., a previously connected wireless speaker, a vehicle wireless system, etc.), or the like.

FIG. 3E illustrates a wireless ear bud 300 paired with a companion communication device 350 with a voice call being received and an on-screen call answering button of the companion communication device 350 being pressed. Initially, as shown in FIG. 3F, the voice call is answered with the audio routed to a speaker of the companion communication device 350 (or to an alternate output as specified by the user of the companion communication device 350). However, as shown in FIG. 3G, when the companion communication device 350 receives a signal indicating a change in a wearing status of the wireless ear bud 300, which indicates that the wireless ear bud 300 is worn in a user's ear, the companion communication device 350 routes audio from the voice call to the paired wireless ear bud 300. Additionally, the companion communication device 350 receives user audio output from the wireless ear bud 300, the user audio being obtained via a microphone of the wireless ear bud 300.

FIG. 3H illustrates a wireless ear bud 300 paired with a companion communication device 350 and a voice call received on the companion communication device 350. When the voice call is answered by the user by pressing an on-screen call answering button of the companion communication device 350, the companion communication device 350 can, based on a signal received from the wireless ear bud 300 that indicates an in-ear status for the wireless ear bud 300, route audio of the voice call to the paired wireless ear bud 300 automatically. Additionally, the companion communication device 350 can receive from the wireless ear bud 300 user audio data for the voice call obtained via the microphone of the wireless ear bud 300.

As explained above, a wide variety of behaviors of a companion communication device can be controlled based at least in part on the companion communication device receiving a signal that indicates a wearing status and/or a change in wearing status of a paired wearable device.

FIG. 3I illustrates a wireless ear bud 300 paired with a companion communication device 350 playing audio through a music application or other media application executing on the companion communication device 350. As shown in FIG. 3J, the wireless ear bud 300 can detect when the wireless ear bud 300 is placed in an ear and can send a signal to the companion communication device 350 indicating a change in a wearing status of the wireless ear bud 300, e.g., from out-of-ear to in-ear. The companion communication device 350 can use the signal received from the wireless ear bud 300 to automatically route audio for the music/media application executing on the companion communication device 350 to the paired wireless ear bud 300.

Next, as shown in FIGS. 3K and 3L, the companion communication device 350 can receive a signal from the paired wireless ear bud 300 indicating that the wearing status of the wireless ear bud 300 has changed, such as when the wireless ear bud 300 is removed from the user's ear. As illustrated in FIG. 3K, the companion communication device 350 can determine to pause the playback of music/audio, or, as illustrated in FIG. 3L, the companion communication device 350 can determine to route the music/audio to a speaker of the companion communication device 350 or to an alternate output of the companion communication device 350 (e.g., to a previously connected wireless speaker, to a vehicle wireless system, etc.), or the like. In some embodiments, a user of the companion communication device 350 can press an on-screen button on the companion communication device 350 to play a music application, after the companion communication device 2350 pauses the music application due to a change in wearing status of a paired wireless ear bud 300, e.g., from in-ear to out-of-ear. Alternatively, the companion communication device 350 can receive a subsequent signal that indicates a change in wearing status of the paired wireless ear bud 300, e.g., from out-of-ear to in-ear, and can cause the music application executing on the companion communication device 350 to resume playback of music/audio and to route the music/audio to the paired wireless ear bud 300.

In some cases, the behavior of a companion communication device can be based on the wearing status of both wireless ear buds in a pair of coupled wireless ear buds. For example, a primary wireless ear bud in a pair of coupled wireless ear buds can receive wearing status data from a secondary wireless ear bud and provide the companion communication device with the wearing status of both wireless ear buds. Alternatively, each wireless ear bud in the pair of coupled wireless ear buds can provide wearing status to the companion communication device. In either case, the companion communication device can change its behavior based on the wearing status of both of the wireless ear buds. For instance, a companion communication device can automatically pause audio only when both wireless ear buds of a pair of coupled wireless ear buds are not worn in ears of the user. In another example, the companion communication device can route audio to a wireless ear bud in mono when only one wireless ear bud is worn in an ear of the user and can route audio to both wireless ear buds in stereo when both wireless ear buds are worn in ears of the user. In some cases, the companion communication device can change its behavior in response to receiving wearing status from a single device, from a pair of devices, from two or more unrelated devices, etc. For example, when a companion communication device detects that a user is wearing a wireless ear bud that can provide audio output and is also wearing glasses that can provide visual output, the companion communication device can route audio information of a video call to the wireless ear bud and can route a video component of the video call to the glasses.

FIG. 3M illustrates a wireless ear bud 300 paired with a companion communication device 360 that is receiving a text message. The wireless ear bud 300 can detect when the wireless ear bud 300 is placed in an ear of a user and can send a signal to the companion communication device 360 indicating a change in a wearing status of the wireless ear bud 300, e.g., from out-of-ear to in-ear. As shown in FIG. 3N, responsive to the companion communication device 360 receiving the signal indicating a change in wearing status of the wireless ear bud 300 from out-of-ear to in-ear under a predetermined condition (e.g., within a predetermined threshold time period), the companion communication device 360 can use text-to-speech software to cause the text message to be converted and sent as audio data to the paired wireless ear bud 300 to play back to the user. In addition, after playback of the audio corresponding to the text message ends, the wireless ear bud 300 can send to the companion communication device 360, voice data of the user obtain via a microphone of the wireless ear bud, and the companion communication device 360 can automatically compose a reply text message using speech-to-text software.

In some embodiments, a companion communication device can send a signal to a paired wearable device to override one or more features to allow signals indicating a wearing status and/or changes in a wearing status to cause changes in operating behavior of the companion communication device.

In some embodiments of the present technology, a companion communication device can receive a signal from a paired wearable device indicating that the wearable device is being charged, being housed in a case, charging in a case, etc. The companion communication device can determine whether to perform certain actions based on such types of events. For example, when a companion communication device is paired with a wearable device that is housed within a case, the companion communication device can perform a polling procedure to locate other devices with which to pair the companion communication device.

Figure 4:
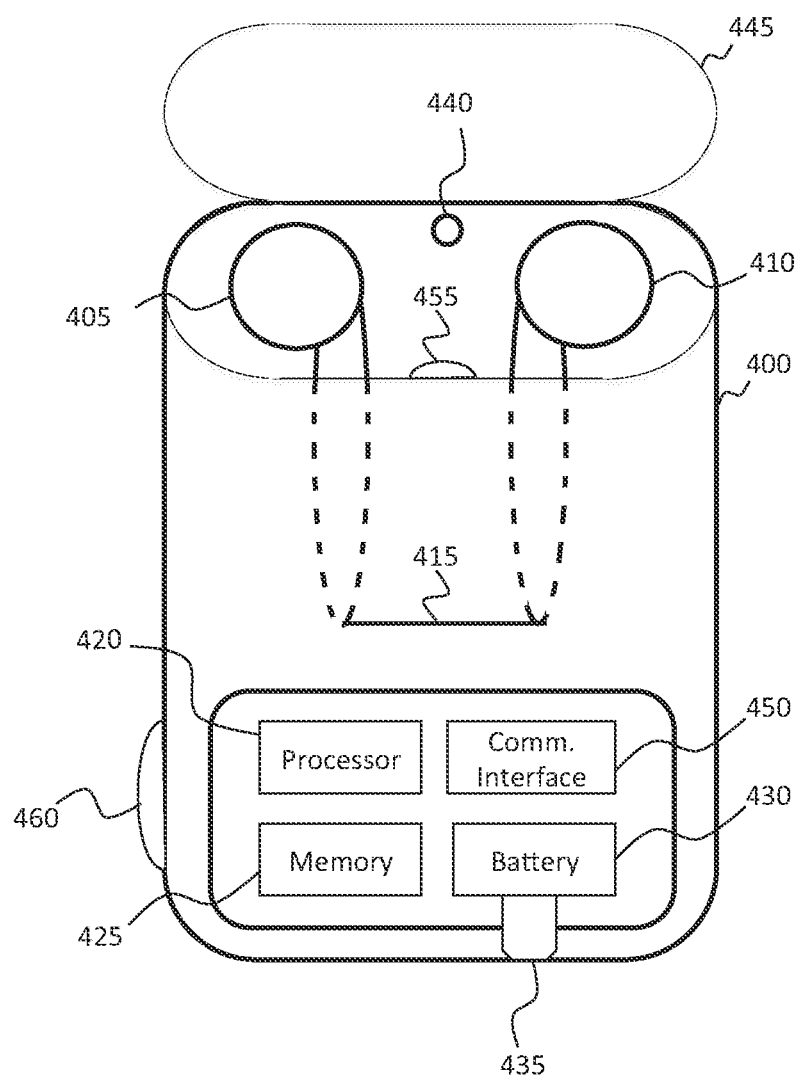
FIG. 4 illustrates an example wireless ear bud case according to some embodiments of the present technology.

FIG. 4 illustrates a wireless ear bud case 400 according to some embodiments of the present technology. The wireless ear bud case 400 houses a pair of wireless ear buds 405, 410 and can connect the wireless ear buds 405, 410 while housed within the wireless ear bud case 400. The wireless ear bud case 400 can include a cover 445 that closes to cover the wireless ear buds 405, 410 housed within the wireless ear bud case 400, and the wireless ear bud case 400 can include a sensor 455 that detects when the cover 445 of the wireless ear bud case 400 is opened and when the cover 445 of the wireless ear bud case 400 is closed. In some embodiments, the wireless ear buds 405, 410 are configured to pair with a companion communication device automatically when the wireless ear bud case 400 is opened for a first time.

The wireless ear bud case 400 also includes a battery 430 that can be used for re-charging the wireless ear buds 405, 410 and a charging interface 435 for connecting the battery 430 to a power source. The wireless ear bud case 400 can also include an indicator 440 to show a charge status of the wireless ear buds 405, 410 and of the wireless ear bud case 400. The wireless ear bud case 400 also includes an input 460, such as a depressible button, to receive manual input to cause the wireless ear buds 405, 410 in the wireless ear bud case 400 to pair to each other and/or to become discoverable to other devices, such as to companion communication devices.

The wireless ear bud case 400 can also include a processor 420, memory 425, and a communication interface 450 that can be used to create a link 415 between the wireless ear buds 405, 410 via the communication interface 450.

The wireless ear buds 405, 410 can be paired to a companion communication device. The companion communication device can receive a signal from a pair of wireless ear buds 405, 410, the signal indicating that the wireless ear buds 405, 410 are housed in the wireless ear bud case 400, are charging in the wireless ear bud case 400, etc. The companion communication device can determine whether to perform certain actions based on such events, e.g., based at least in part on a wearing status of one or more wireless ear buds 405, 410, a housing indication for the one or more wireless ear buds 405, 410, and/or a charging status of the one or more wireless ear buds 405, 410.

In some embodiments of the present technology, a companion communication device can execute an operating system that allows customization of operating system settings, application preference settings, user interface settings, etc. As a result, multiple applications that have audio components can execute simultaneously on the companion communication device. Therefore, a decision to automatically route audio (or more generally media) to a wearable device in response to occurrence of an event (e.g., when music is output by a music player) is not intuitive. Accordingly, some embodiments of the present technology involve a wearable device pairing with a companion communication device and causing the companion communication device to provide an indication that allows audio (or more generally media) to a wearable device. For example, pairing a wireless ear bud with a laptop and subsequently receiving a signal from the wireless ear bud that indicates the wireless ear bud is worn in an ear of a user can cause the laptop to publish an audio route that allows user-selectable controls to route audio from an application running on the laptop (e.g., a video chat application, a music player application, etc.) to the wearable device. When the companion communication device receives a signal indicating that the wireless ear bud is not worn, e.g., removed, from an ear of the user, the companion communication device can revoke (e.g., un-publish) the wireless ear bud as an audio route and revert to another audio route, such as a default audio route or a previously used audio route.

In an embodiment, a method, performed by a companion communication device, includes: determining, based on a first signal received from a wireless ear bud, a first wearing status indicating whether a user is wearing the wireless ear bud; sending audio information of the companion communication device to a first output based on the first wearing status; detecting, based on a second signal received from the wireless ear bud, a change in wearing status of the wireless ear bud to a second wearing status; and changing a behavior of the companion communication device based at least in part on the change in the wearing status of the wireless ear bud.

In some embodiments, sending the audio information of the companion communication device to the first output includes sending the audio information of the companion communication device to the wireless ear bud via a wireless communication interface of the companion communication device when the first wearing status indicates that the user is wearing the wireless ear bud or that the user placed the wireless ear bud in an ear of the user. In some embodiments, detecting the change in the wearing status of the wireless ear bud to the second wearing status includes detecting when the wireless ear bud is removed from the ear of the user. In some embodiments, changing the behavior of the companion communication device includes sending the audio information of the companion communication device to an alternate output when the user is not wearing the wireless ear bud of the wireless ear bud is removed from the ear of the user. In some embodiments, the alternate output includes an output of the companion communication device used for audio reproduction before sending the audio information of the companion communication device to the wireless ear bud. In some embodiments, changing the behavior of the companion communication device includes pausing the audio information of the companion communication device when the wireless ear bud is removed from the ear of the user. In some embodiments, detecting the change in the wearing status of the wireless ear bud includes detecting when the wireless ear bud is placed in an ear of the user. In some embodiments, changing the behavior of the companion communication device includes sending the audio information of the companion communication device to the wireless ear bud via a wireless communication interface of the companion communication device when the wireless ear bud is placed in the ear of the user. In some embodiments, the audio information of the companion communication device comprises audio information associated with a voice application for voice calls, and changing the behavior of the companion communication device includes, when the wireless ear bud is placed in the ear of the user, answering an in-coming voice call, and sending the audio information associated with the voice application for the in-coming voice call to the wireless ear bud via a wireless communication interface of the companion communication device.

In an embodiment, a wearable device includes: a processor; a sensor configured to determine a first wearing status indicating whether the wearable device is being worn; and a communication interface configured to pair the wearable device to a companion communication device and to send a signal to the companion communication device to cause the companion communication device to send audio information of the companion communication device to a first output based on the first wearing status, where the sensor is further configured to detect a change in wearing status of the wearable device to a second wearing status, and the communication interface is further configured to send a signal to the companion communication device to cause the companion communication device to change a behavior of the companion communication device based at least in part on the change in the wearing status of the wearable device.

In some embodiments, the wearable device further includes a speaker, where the communication interface is further configured to receive the audio information of the companion communication device, and the processor is configured to play the audio information of the companion communication device via the speaker of the wearable device as the first output. In some embodiments, the sensor is further configured to detect when the wearable device is not worn by the user. In some embodiments, the signal sent to the companion communication device causes the companion communication device to send the audio information of the companion communication device to an alternate output when the wearable device is not being worn. In some embodiments, the signal to the companion communication device to cause the companion communication device to change the behavior of the companion communication device includes a signal to pause the audio information when the wearing status of the wearable device changes to indicate that the wearable device is no longer being worn. In some embodiments, the sensor is further configured to detect when the wearable device is placed into an ear. In some embodiments, the signal to the companion communication device causing the companion communication device to change the behavior of the companion communication device causes the companion communication device to route the audio information of the companion communication device to the wearable device when the wearable device is placed into the ear. In some embodiments, the audio information of the companion communication device includes audio information of a voice application for voice calls, and changing the behavior of the companion communication device includes, when the wearable device is placed into the ear, answering an in-coming voice call; and sending the audio information of the voice application for the in-coming voice call to the wearable device.

In an embodiment, a method performed by a companion communication device includes: determining, based on a first signal received from a wireless ear bud, a first wearing status indicating whether a user is wearing the wireless ear bud; receiving an incoming voice call at the companion communication device; and when the first wearing status indicates the user is wearing the wireless ear bud, answering the voice call; and sending audio information of the voice call to the wireless ear bud.

In some embodiments, the method further includes: when the first wearing status indicates the user is not wearing the wireless ear bud, detecting, based on a second signal received from the wireless ear bud, a change in wearing status of the wireless ear bud to a second wearing status indicating that the user inserted the wireless ear bud into an ear of the user; and responsive to the detecting the change in the wearing status of the wireless ear bud to the second wearing status, sending the audio information of the voice call to the wireless ear bud. In some embodiments, the method further includes: detecting, based on a third signal received from the wireless ear bud, a further change in the wearing status of the wireless ear bud to a third wearing status indicating that the user removed the wireless ear bud from the ear of the user; and responsive to the detecting the change in the wearing status of the wireless ear bud to the third wearing status, sending the audio information of the voice call to a speaker of the companion communication device.

In an embodiment, a method of changing a behavior of a companion communication device by a wearable device includes: pairing the wearable device with the companion communication device; determining, using a sensor of the wearable device, a first wearing status indicating whether a user is wearing the wearable device; sending a signal to the companion communication device to cause the companion communication device to send audio information of the companion communication device to a first output based on the first wearing status; detecting a change in wearing status of the wearable device to a second wearing status; and sending a signal to the companion communication device to cause the companion communication device to change a behavior of the companion communication device based at least in part on the change in wearing status of the wearable device.

In an embodiment, a non-transitory computer-readable storage medium stores instructions that, when executed by a computing device, cause the computing device to perform a method including: determining, based on a first signal received from a wireless ear bud, a first wearing status indicating whether a user is wearing the wireless ear bud; sending audio information of the computing device to a first output based on the first wearing status; detecting, based on a second signal received from the wireless ear bud, a change in wearing status of the wireless ear bud to a second wearing status; and changing a behavior of the computing device based at least in part on the change in the wearing status of the wireless ear bud.

In an embodiment, an apparatus includes: means for determining, based on a first signal received from a wireless ear bud, a first wearing status indicating whether a user is wearing the wireless ear bud; means for sending audio information of the computing device to a first output based on the first wearing status; means for detecting, based on a second signal received from the wireless ear bud, a change in wearing status of the wireless ear bud to a second wearing status; and means for changing a behavior of the computing device based at least in part on the change in the wearing status of the wireless ear bud.

Figure 5A:
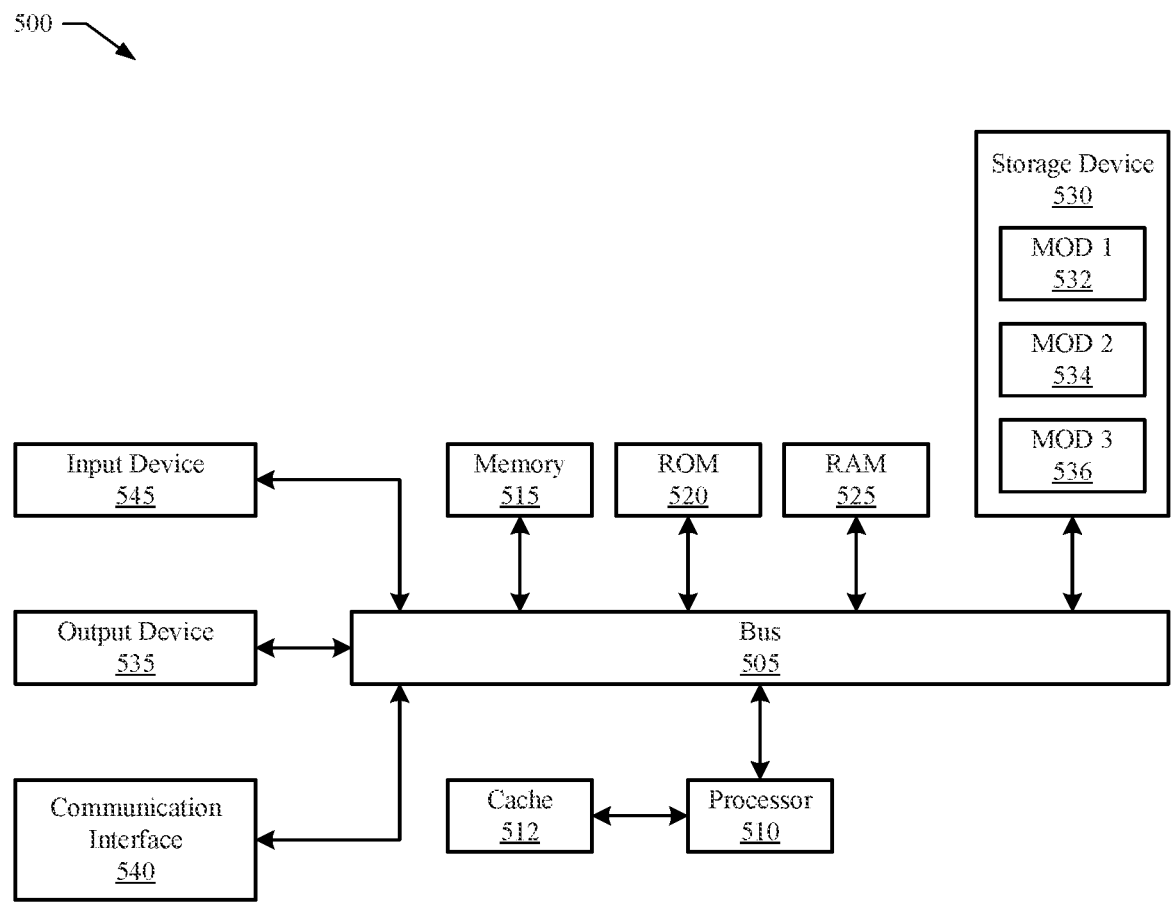
FIG. 5A and FIG. 5B illustrate exemplary possible system embodiments.
Figure 5B:
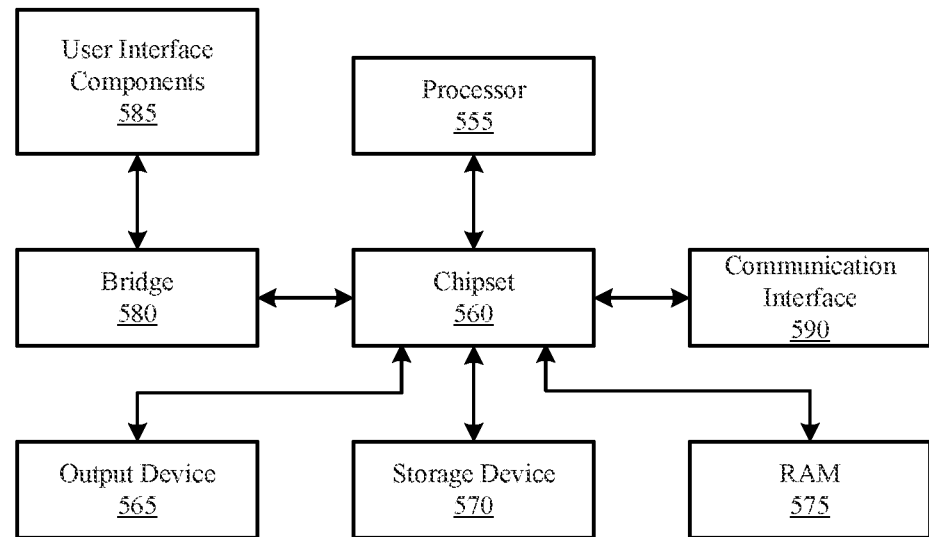

FIG. 5A and FIG. 5B illustrate exemplary possible system embodiments. FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks.

Some applications of the methods for generating, displaying, and using the GUI disclosed herein can include receiving ordered datasets over the physical interface or be generated by the machine itself by processor 555 analyzing data stored in storage device 570. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
by a companion communication device:
detecting, based on a signal received from a wearable audio output device, a change in wearing status from a first status to a second status; and
changing, based at least in part on the change in wearing status of the wearable audio output device:
an audio output operation of the companion communication device; and
display of a user-selectable control for routing audio information associated with one or more applications executing on the companion communication device.

2. The method of claim 1, wherein changing the audio output operation of the companion communication device comprises:
selecting an audio route from at least two possible audio routes based on the change in wearing status; and
sending audio information associated with the companion communication device to an audio output of the companion communication device when the change in wearing status indicates that the wearable audio output device is not being worn.

3. The method of claim 2, wherein:
the audio information associated with the companion communication device comprises audio information corresponding to a voice call application.

4. The method of claim 2, wherein:
the audio information associated with the companion communication device comprises audio information corresponding to a media application executing on the companion communication device.

5. The method of claim 1, wherein:
changing the display of the user-selectable control for routing audio information comprises removing an option associated with the wearable audio output device as an audio route.

6. The method of claim 1, wherein:
changing the audio output operation of the companion communication device comprises pausing output of audio information by the companion communication device.

7. The method of claim 1, wherein:
changing the audio output operation of the companion communication device comprises un-publishing, by an operating system component, availability of an audio route associated with the wearable audio output device.

8. The method of claim 1, wherein:
the wearable audio output device comprises at least one ear bud of a pair of ear buds; and
the wearing status indicates whether the at least one ear bud is being worn by a user.

9. A wearable device comprising:
a processor;
a speaker;
a sensor configured to determine a change in wearing status of the wearable device; and
a communication interface configured to pair the wearable device with a companion communication device and to send a first signal to the companion communication device to cause the companion communication device to:
detect, based on a signal received from the wearable device, a change in wearing status from a first wearing status that indicates the wearable device is being worn to a second wearing status that indicates the wearable device is not being worn; and
change, based at least in part on the change in wearing status of the wearable device, display of a user-selectable control for routing audio information associated with one or more applications executing on the companion communication device.

10. The wearable device of claim 9, wherein:
the communication interface is further configured to receive audio information associated with the companion communication device, and
the processor is configured to generate an audio output signal, for output by the speaker, based on the received audio information.

11. The wearable device of claim 9, wherein the first signal to the companion communication device causes the companion communication device to:
select an audio route from at least two possible audio routes based on the change in wearing status; and
send, based on the audio route, audio information associated with the companion communication device to an audio output of the companion communication device instead of to the wearable device.

12. The wearable device of claim 9, wherein change display of the user-selectable control for routing audio information comprises:
removing an option for the wearable device as an audio route.

13. A companion communication device comprising:
a wireless communications interface configured to communicate with a wireless ear bud;
a speaker for outputting audio;
a processor coupled to the wireless communications interface; and
a memory storing instructions that, when executed by the processor cause the companion communication device to perform operations including:
detecting, based at least on a signal received from the wireless ear bud, a change in wearing status from a first wearing status indicating that the wireless ear bud is being worn to a second wearing status indicating that the wireless ear bud is not being worn; and
changing, based at least in part on the change in wearing status of the wireless ear bud:
a behavior of the companion communication device; and
display of a user-selectable control to route audio information associated with one or more applications executing on the companion communication device.

14. The companion communication device of claim 13, wherein changing the behavior of the companion communication device comprises:
selecting an audio route from at least two possible audio routes based on the change in the wearing status; and
sending, based on the audio route, audio information associated with the companion communication device to an audio output of the companion communication device.

15. The companion communication device of claim 13, wherein:

changing the display of the user-selectable control to route audio information comprises removing an audio route option associated with the wireless ear bud.

16. The companion communication device of claim 13, wherein:
changing the behavior of the companion communication device comprises pausing audio information of the companion communication device.

17. The companion communication device of claim 13, wherein:
changing, based on the change in wearing status, the behavior of the companion communication device comprises un-publishing, by an operating system component, availability of an audio route associated with the wireless ear bud.

18. The companion communication device of claim 17, wherein:
un-publishing the availability of the audio route associated with the wireless ear buds disallows selecting, on the companion communication device, the wireless ear bud for audio reproduction.

19. An apparatus for operation in a companion communication device, the apparatus comprising:
a processor communicatively coupled to a memory storing instructions that, when executed by the processor, configure the companion communication device to perform actions including:
detecting, based on a signal received from a wearable audio output device, a change in wearing status from a first status to a second status; and
changing, based at least in part on the change in wearing status of the wearable audio output device:
an audio output operation of the companion communication device; and
display of a user-selectable control for routing audio information associated with one or more applications executing on the companion communication device.

20. The apparatus of claim 19, wherein changing the audio output operation of the companion communication device comprises:
selecting an audio route from at least two possible audio routes based on the change in wearing status; and
sending audio information associated with the companion communication device to an audio output of the companion communication device when the change in wearing status indicates that the wearable audio output device is not being worn.

21. The apparatus of claim 19, wherein:
changing the audio output operation of the companion communication device comprises pausing output of audio information by the companion communication device.

* * * * *